United States Patent [19]

Edwards et al.

[11] E Patent Number: Re. 33,324

[45] Reissued Date of Patent: Sep. 4, 1990

[54] ENDLESS DRIVE SYSTEM

[75] Inventors: John W. Edwards, Brandon; Daniel R. Harper; Quinton B. McNew, both of Ft. Myers, all of Fla.

[73] Assignee: Edwards, Harper, McNew & Co., Fort Myers, Fla.

[21] Appl. No.: 49,382

[22] Filed: May 13, 1987

Related U.S. Patent Documents

Reissue of:

[64] Patent No.: 4,569,561
Issued: Feb. 11, 1986
Appl. No.: 607,067
Filed: May 4, 1984

U.S. Applications:

[63] Continuation-in-part of Ser. No. 516,831, Jul. 25, 1983, abandoned.

[51] Int. Cl.[5] ..... B62D 55/205

[52] U.S. Cl. ..... 305/35 R; 305/41; 305/57; 474/201; 474/242

[58] Field of Search ..... 305/35 R, 35 EB, 39, 305/40, 56, 57, 41, 13; 474/153, 164, 166, 167, 175, 176, 244, 245, 901, 201, 242

[56] References Cited

U.S. PATENT DOCUMENTS

| | | | |
|---|---|---|---|
| 296,998 | 4/1884 | Page . | |
| 394,335 | 12/1888 | Chase . | |
| 893,787 | 7/1908 | Conklin . | |
| 902,224 | 10/1908 | Fouillaron | 474/201 |
| 905,405 | 12/1908 | Britton . | |
| 1,217,007 | 2/1917 | Jory . | |
| 1,400,100 | 12/1921 | Reddaway . | |
| 1,420,531 | 6/1922 | Dutkiewicz et al. . | |
| 1,693,833 | 12/1928 | Worley . | |
| 1,789,084 | 1/1931 | Schwarz . | |
| 1,814,046 | 7/1931 | Kegresse . | |
| 1,862,784 | 6/1932 | Choate . | |
| 1,898,035 | 2/1933 | Diamond . | |
| 1,911,184 | 5/1933 | Flynn | 474/242 |
| 1,966,831 | 7/1934 | Oakes et al. | 474/201 X |
| 1,973,214 | 9/1934 | Lamb . | |
| 1,975,726 | 10/1934 | Martinage . | |
| 2,025,007 | 12/1935 | Wendling | 474/242 |
| 2,037,983 | 4/1936 | Johnston . | |
| 2,116,834 | 5/1938 | Kegresse . | |
| 2,290,109 | 7/1942 | Mayne . | |
| 2,309,648 | 2/1943 | Kelly | 474/242 |
| 2,322,466 | 6/1943 | Perry | 474/242 |
| 2,338,817 | 1/1944 | Mayne . | |
| 2,342,953 | 2/1944 | Mayne . | |
| 2,345,763 | 4/1944 | Mayne . | |
| 2,350,076 | 5/1944 | Smith et al. . | |
| 2,374,240 | 4/1945 | Shankman . | |
| 2,376,802 | 5/1945 | Morse . | |
| 2,387,802 | 10/1945 | Mayne . | |
| 2,410,507 | 11/1946 | Knight . | |
| 2,412,122 | 12/1946 | Campbell . | |
| 2,449,421 | 9/1948 | Slemmons et al. . | |
| 2,476,460 | 7/1949 | Smith . | |
| 2,476,828 | 7/1949 | Skromme . | |
| 2,487,813 | 11/1949 | Knox . | |
| 2,531,111 | 11/1950 | Daniels . | |
| 2,537,745 | 1/1951 | Daniels . | |
| 2,541,177 | 2/1951 | Slemmons . | |
| 2,592,541 | 4/1952 | Curtis | 305/57 |
| 2,592,916 | 4/1952 | Leguillon . | |
| 2,608,875 | 9/1952 | Ellison et al. . | |
| 2,728,612 | 12/1955 | Howe et al. . | |
| 2,732,265 | 1/1956 | Cuthbertson . | |
| 2,733,965 | 2/1956 | Gladden | 305/40 |
| 2,796,303 | 6/1957 | Atkinson . | |
| 2,803,504 | 8/1957 | Lynch . | |
| 2,823,082 | 2/1958 | Bauer, Jr. . | |
| 2,845,308 | 7/1958 | Woltemar . | |
| 2,900,210 | 8/1959 | Parsons . | |
| 3,013,844 | 12/1961 | Mazzarins . | |
| 3,019,062 | 1/1962 | Long . | |
| 3,068,711 | 12/1962 | Even . | |
| 3,093,006 | 6/1963 | Gamaunt . | |
| 3,104,113 | 9/1963 | Montz . | |
| 3,105,390 | 10/1963 | Funke et al. . | |
| 3,118,709 | 1/1964 | Case | 305/37 |
| 3,133,767 | 5/1964 | Wunsch | 305/56 |
| 3,250,577 | 5/1966 | Olson . | |
| 3,373,067 | 3/1968 | Hagstrom . | |
| 3,439,959 | 4/1969 | Bowen et al. . | |
| 3,451,728 | 6/1969 | Bruneau . | |
| 3,480,339 | 11/1969 | Kell . | |
| 3,567,291 | 3/1971 | Paulson | 305/37 |
| 3,604,763 | 9/1971 | Maguire | 305/35 EB |
| 3,606,497 | 9/1971 | Gilles | 305/56 |
| 3,618,384 | 11/1971 | Bierlein . | |

| | | | |
|---|---|---|---|
| 3,625,574 | 12/1971 | Plastino | 305/40 |
| 3,630,580 | 12/1971 | Grawey et al. | 305/19 |
| 3,645,586 | 2/1972 | Piepho | 305/10 |
| 3,703,321 | 11/1972 | Schoonover | 305/38 |
| 3,714,838 | 2/1973 | Gilson | 474/175 X |
| 3,734,576 | 5/1973 | Heiple et al. | 305/37 |
| 3,736,032 | 5/1973 | Mosshart et al. | 305/35 EB |
| 3,758,171 | 9/1973 | Plastino | 305/41 X |
| 3,771,844 | 11/1973 | Perreault | 305/35 EB |
| 3,773,394 | 11/1973 | Grawey | 305/38 |
| 3,808,901 | 5/1974 | Berg . | |
| 3,857,617 | 12/1974 | Grawley | 305/38 |
| 3,880,478 | 4/1975 | Baylor | 305/13 |
| 3,888,132 | 6/1975 | Russ, Sr. | 305/35 EB |
| 3,899,219 | 8/1975 | Boggs | 305/13 |
| 3,899,220 | 8/1975 | Grawey et al. | 305/54 |
| 3,900,231 | 8/1975 | Ohm . | |
| 3,955,855 | 5/1976 | Massieon et al. | 305/38 |
| 3,993,366 | 11/1976 | Orpana | 305/57 X |
| 4,023,865 | 5/1977 | Morissette | 305/35 EB |
| 4,093,318 | 6/1978 | Edwards | 305/57 |
| 4,099,794 | 7/1978 | Hoffart | 305/13 |
| 4,141,599 | 2/1979 | Stolz | 305/35 R |
| 4,145,092 | 3/1979 | Kasin | 305/35 EB |
| 4,175,796 | 11/1979 | Boggs et al. | 305/57 |
| 4,203,633 | 5/1980 | Hare | 305/57 |
| 4,217,006 | 8/1980 | Dehnert | 305/35 EB |
| 4,281,882 | 8/1981 | van der Lely | 305/35 EB |
| 4,349,234 | 9/1982 | Hartmann | 305/56 |
| 4,362,340 | 12/1982 | van der Lely | 305/35 EB |
| 4,365,965 | 12/1982 | Russ, Sr. | 474/244 |
| 4,410,219 | 10/1983 | van der Lely | 305/35 EB |
| 4,448,273 | 5/1984 | Barbieri | 305/41 |
| 4,449,958 | 5/1984 | Conrad | 474/205 |
| 4,452,496 | 6/1984 | van der Lely | 305/35 EB |
| 4,473,366 | 9/1984 | Cataldo | 474/242 |
| 4,484,903 | 11/1984 | Schneider | 474/242 |
| 4,541,822 | 9/1985 | Stiles | 474/242 X |
| 4,569,561 | 2/1986 | Edwards et al. | 305/40 |
| 4,595,385 | 6/1986 | Henderson | 474/201 |
| 4,616,883 | 10/1986 | Edwards et al. | 305/40 |
| 4,618,190 | 10/1986 | Garman et al. | 305/39 |

FOREIGN PATENT DOCUMENTS

| | | | |
|---|---|---|---|
| 560157 | 7/1958 | Canada | 305/41 |
| 922346 | 3/1973 | Canada . | |
| 948243 | 5/1974 | Canada . | |
| 473073 | 3/1929 | Fed. Rep. of Germany . | |
| 1149255 | 12/1960 | Fed. Rep. of Germany . | |
| 1918554 | 6/1965 | Fed. Rep. of Germany . | |
| 710824 | 8/1931 | France | 305/41 |
| 798665 | 5/1936 | France | 305/41 |
| 2378669 | 8/1978 | France . | |
| 55-55063 | 4/1980 | Japan . | |
| 57-144175 | 6/1982 | Japan . | |
| 61597 | 11/1925 | Sweden | 474/201 |
| 27210 | 2/1902 | Switzerland | 474/175 |
| 170900 | 10/1934 | Switzerland . | |
| 3500200 | 12/1960 | Switzerland . | |
| 223515 | 10/1924 | United Kingdom . | |
| 649378 | 1/1951 | United Kingdom | 474/244 |
| 1604615 | 12/1981 | United Kingdom . | |
| 2104015 | 3/1983 | United Kingdom . | |

OTHER PUBLICATIONS

*MaCarthur Press (Books) Pty. Ltd.*, "Blackwoods General Catalogue", published in Australia in 1979, p. 841.

Caterpillar (undated), "Cat Challenger 65 The Total Field Machine", 12 pages.

Fabricon 81 brochure, Vannerflex TM, "Cleated Conveyor Belting for Industry", pp. 1-17, Portland, Ore.

Photograph of track contented by Caterpillar Tractor Co. to have been in public use as of Jan., 1981.

*Primary Examiner*—Russell D. Stormer

*Attorney, Agent, or Firm*—Oliff and Berridge

[57] ABSTRACT

An endless drive system suitable for use, for example, as a tracked vehicle drive system, an endless belt or an endless chain drive system. A number of endless drive sections are interconnected by cable connector sections. The cable connector sections include cables which can be encased in rubber. The cables can be provided with end retaining members which aid in retaining the cable connector sections and the endless drive sections together and which prevent expanding, fraying or unwinding of the cable ends. Special end retaining members can be utilized to aid self-alignment of the system.

88 Claims, 5 Drawing Sheets

FIG. 1
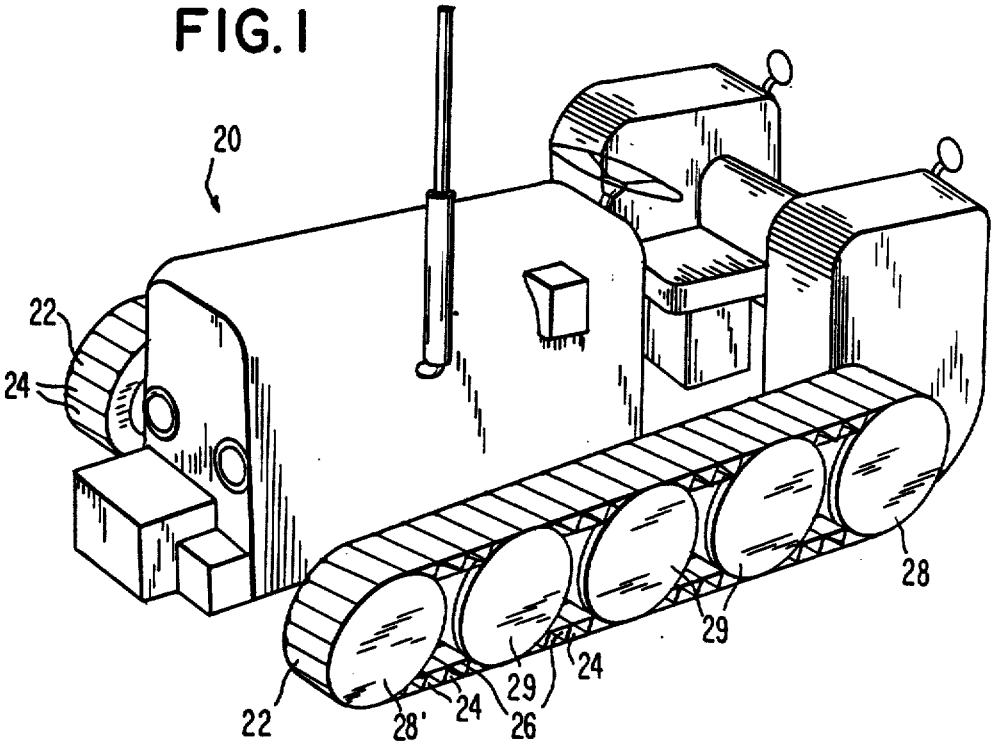
FIG. 3
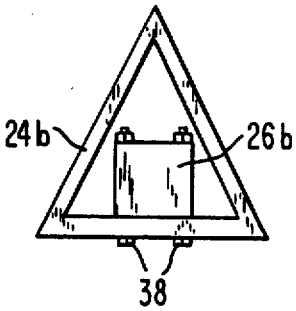
FIG. 4
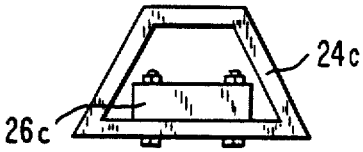
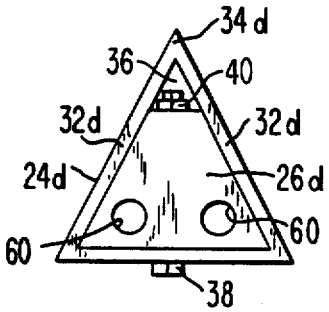
FIG. 5
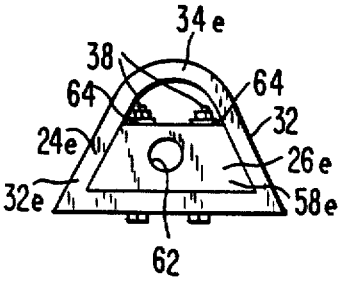
FIG. 6
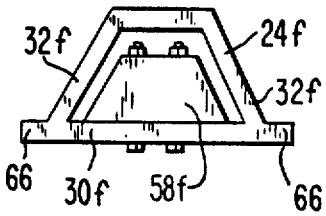
FIG. 7

ENDLESS DRIVE SYSTEM

Matter enclosed in heavy brackets [ ] appears in the original patent but forms no part of this reissue specification; matter printed in italics indicates the additions made by reissue.

CROSS REFERENCE TO RELATED APPLICATION

This application *is a reissue of application Ser. No. 607,067 (U.S. Pat. No. 4,569,561), which in turn* is a continuation-in-part of our copending application Ser. No. 516,831 filed July 25, 1983 and now abandoned.

BACKGROUND OF THE INVENTION

The present invention pertains to an endless drive system. More particularly, the present invention pertains to an endless drive system suitable for use as a tracked vehicle drive system in a vehicle such as a tractor, bulldozer or tank, for use as an endless belt, or for use as an endless chain drive. By way of example, an endless drive system in accordance with the present invention might be used on a tractor of a crop harvesting apparatus of the type disclosed in Edwards U.S. Pat. No. 4,202,158, issued May 13, 1980.

U.S. Pat. No. 4,093,318, issued June 6, 1978 to John W. Edwards, the disclosure of which is incorporated herein by reference, describes and claims an endless drive system including a plurality of endless drive sections, each having a substantially flat contact surface and sloped surfaces to distribute weight and shed dirt and other foreign objects. Pivotal means of connecting these endless drive sections enable the movement of the endless drive system in an endless path. It has been found that dirt and foreign objects still cause some difficulties with the endless drive system of U.S. Pat. No. 4,094,318, particularly when used as the drive system of a tracked vehicle.

SUMMARY OF THE INVENTION

The present invention concerns improvements on the endless drive system of Edwards' U.S. Pat. No. 4,093,318, particularly improvements on the pivotal means of connecting the endless drive sections. In a preferred embodiment of the present invention, the endless drive system is made up of a number of endless drive sections interconnected by cable connector sections. Preferably, these cable connector sections include cables encased in rubber or other suitable material, and the combination of the cable and the encasing material provides both elasticity, assuring sufficient flexibility to permit the drive system to move in an endless path, and tensile strength, necessary to retain the endless drive sections together as an endless drive system.

The cables which interconnect the endless drive sections provide great strength and reliability, with minimum noise and with considerable freedom from maintenance. By encasing the cables in, for example, rubber, the present invention prevents dirt from accumulating and from detrimentally affecting the cables. Consequently, the shield portion utilized in the endless drive system of U.S. Pat. No. 4,093,318 is unnecessary, and yet the system of the present invention is adaptable to a wide range of environments, including sand, mud, and hazardous environments such as fire fighting. Further, the rubber reduces the noise of the endless drive system. In accordance with the present invention, the cables are preferably provided with end retaining members which aid in retaining the cable connector sections and the endless drive sections together as an endless drive system and which prevent expanding, fraying, or unwinding of the cable ends. These end retaining members might also aid in self-alignment of the cable connector sections and thus of the overall endless drive system.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

FIG. 1 is a perspective view of a tractor equipped with a pair of endless drive systems in accordance with the present invention;

FIGS. 3 through 7 are elevational views depicting various embodiments of endless drive sections and various embodiments of cable connector sections each of which is suitable for incorporation in an endless drive system in accordance with the present invention;

DETAILED DESCRIPTION OF SOME PREFERRED EMBODIMENTS

Figure 2:
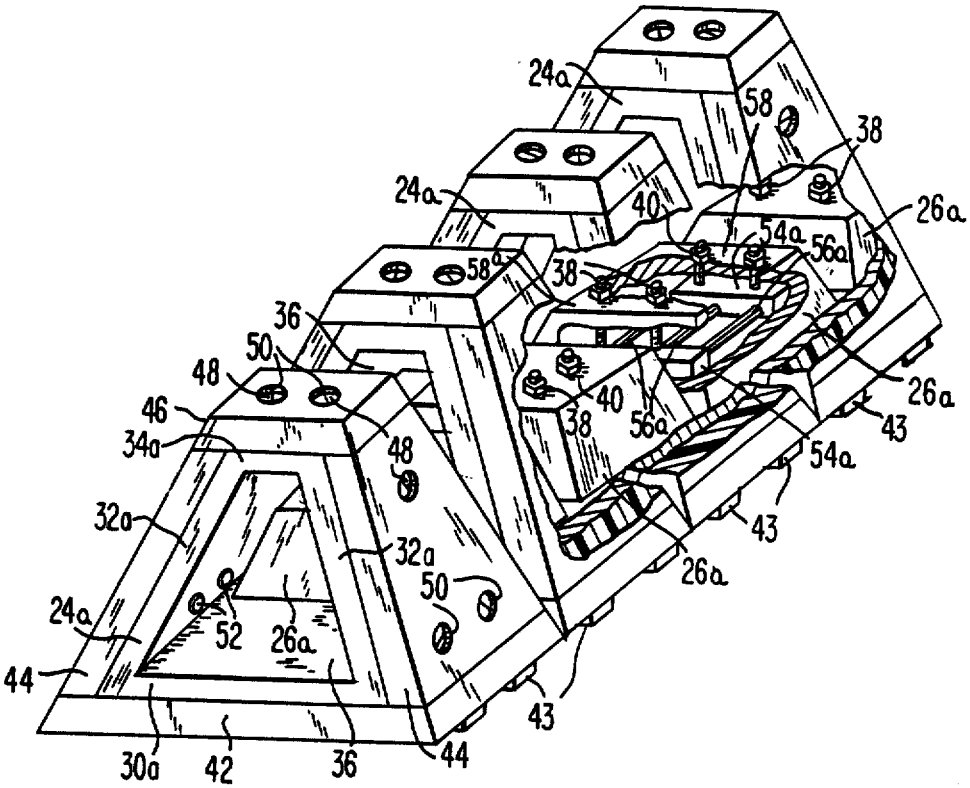
FIG. 2 is a fragmentary perspective view, partially broken, illustrating an endless drive system in accordance with the present invention.

A preferred use of the endless drive system of the present invention is as a drive system for a tracked vehicle such as tractor 20 depicted in FIG. 1. As there depicted, tractor 20 is equipped with two endless drive systems 22. Each endless drive system 22 is made up of a number of endless drive sections 24 which are joined together by cable connector sections 26 in a closed loop to form the endless drive systems 22. Tractor 20 includes the necessary power source and controls to permit endless drive systems 22 to propel the tractor over terrain as desired.

Each endless drive system 22 passes about a number of wheels including end wheels 28, and idler wheels or rollers 29. While FIG. 1 depicts three idler wheels 29 on each side of tractor 20, the number of central wheels utilized depends upon the size of the tractor, the size of the wheels, and the size of the endless drive system 22. At least one of the wheels 28 and 29 for each endless drive system 22 of tractor 20 is powered by an engine or other suitable power source.

FIG. 2 depicts a number of endless drive sections 24a joined together by a number of cable connector sections 26a in accordance with a first embodiment of the present invention. For clarity and to permit showing of detail, in FIG. 2 the cable connector section 26a which would connect the front endless drive section 24a to the section 24a in front of it has been omitted. In practice, several endless drive sections 24a and cable connector sections 26a would be utilized to form an endless drive system. Each endless drive section 24a is formed of a rigid frame which includes a substantially closed shoe portion 30a having first and second side edges, first and second substantially closed side walls 32a extending from the first and second side edges of the shoe portion 30a and sloping inwardly therefrom toward the center of the endless drive system, and closed central surface 34a joining the first and second side walls 32a. Shoe portion 30a, the two side walls 32a, and central surface 34a thus define a chamber 36 open at its front and rear end faces.

Each contiguous pair of endless drive sections 24a is coupled together by a cable connector section 26a. Thus, each cable connector section 26a is fastened, for example by a first pair of bolt and nut fasteners 38, to the shoe portion 30a of one endless drive section 24a and by a second pair of bolt and nut fasteners 40 to the shoe portion 30a of the adjacent endless drive section 24a. Accordingly, the plurality of endless drive sections 24a is joined together by the like plurality of cable connector sections 26a to form an endless drive system.

As depicted in FIGS. 1 and 2, the sloping side walls 32a of each endless drive section 24 preferably taper inwardly from a wider dimension along the lower edges thereof at shoe portion 30a to a narrower dimension at central surface 34a. This taper aids in the flexing of the endless drive system as it moves about end wheels 28. As also depicted in FIG. 2, each endless drive section 24a is preferably provided with a tread member 42 which might include a grouser 43 and which is fastened to shoe portion 30. Further, wear pads 44 are preferable fastened to the sloping side walls 32a, and wear pad 46 is preferably fastened to central surface 34a. These wear pads might be formed of rubber such as 80 durometer rubber with a steel contact plate on the surface abutting the side walls 32a and the central surface 34a. Thus, typical wear pads 44 and 46 might be one inch of 80 durometer rubber on a one-fourth inch steel plate. Alternatively, the wear pads could be a synthetic material, for example a polyurethane or other plastic, or for hazardous use such as on a fire fighting vehicle the wear pads could be steel. The wear pads 44 and 46 can be attached, for example, by means of bolts 48 which pass through countersunk openings 50 in the wear pads and mate with nuts 52 or with threaded openings in the walls 32a and surface 34a. The wear pads 44 and 46 and the tread members 42 prolong the life of the endless drive sections, in that when the wear pads or tread members are worn, their replacement renews the endless drive sections.

In the embodiment depicted in FIG. 2, each cable connector section 26a includes two cable clamps 54a with a plurality of multistrand cables 56a extending between them. The two cable clamps 54a and the cables 56a are encased within resilient housing 58a which, for example, can be rubber. One end of each cable connector section 26a is fastened to a first endless drive section 24a by bolt and nut fasteners 38, with the bolts passing through the shoe portion 30a of that section 24a, through rubber housing 58a, and through a first one of the cable clamps 54a. The second end of each cable connector section 26a is connected to the adjacent endless drive section 24a by bolt and nut fasteners 40, with the bolts passing through the shoe portion 30a of that section 26a, through rubber housing 58a, and through the second cable clamp 54a.

Rubber housing 58a can be molded about the two cable clamps 54a and cables 56a, with the openings for passage of the bolts of bolt and nut fasteners 38 and 40 formed during the molding process. Such technique firmly grips the cables. Cable clamps 54a fit tightly about the ends of cables 56a to hold the cables rigidly.

Endless drive sections 24 and cable connector sections 26 can take any of several configurations. FIG. 2 depicts each of these as truncated triangular sections, with cable connector sections 26a being slightly narrower than the open chamber 36 so that a small space exists on each side of cable connector sections 26a to enable any dirt or other foreign objects which might enter to fall freely from open chamber 36 as the endless drive system operates.

FIGS. 3 through 7 illustrate a number of alternative embodiments of endless drive sections 24 and of cable connector sections 26, although additional alternative embodiments are also possible within the scope of the present invention. FIG. 3 depicts endless drive section 24b of a triangular shape and cable connector section 26b of rectangular shape. FIG. 4 depicts endless drive section 24c of a truncated triangular shape similar to that of sections 24a of FIG. 2, but shows cable connector section 26c of a low rectangular shape, just sufficient to fully encase the cable clamps and the cables. FIG. 5 depicts triangular endless drive section 24d with a triangular cable connector section 26d fitting snugly against the inner surfaces of the sloping side walls 32d. Triangular cable connector section 26d fills most of the chamber 36 of endless drive section 24d, having only enough room beneath the central surface 34d for the bolt and nut fasteners 38 and 40. The rubber portion of cable connector section 26d is preferably provided with one or more holes 60 to increase the flexibility of the cable connector section. FIG. 6 depicts an endless drive section 24e with sloping side walls 32e joined by rounded or curved central surface 34e. FIG. 6 also depicts a truncated triangular cable connector section 26e having a hole 62 therethrough to increase flexibility. FIG. 6 also depicts the bolt and nut fasteners 38 as including washers 64 to increase the area of contact on the upper surface of the rubber housing 58e. FIG. 7 depicts endless drive section 24f of a generally truncated triangular shape but with the shoe portion 30f thereof extending beyond the sloping side walls 32f thereof to provide flanges 66. Rubber wear pads are fastened to side walls 32f and abut against the flanges 66. If desired, the rubber housings 58f or the side wall wear pads 44 can be contoured to include a rib so that as the endless drive sections curve around end wheels 28, the ribs fill any voids between the side walls 32 of adjacent drive sections 24, providing a substantially smooth surface. Rubber wear pads, such as pads 44 and 46 of FIG. 2, can be utilized with any of the endless drive sections of FIGS. 3 through 6 as well. It is thus seen that the endless drive sections and the cable connector sections can have any of numerous configurations in accordance with the present invention, some of which are depicted in detail in FIGS. 2–7.

Figure 8:
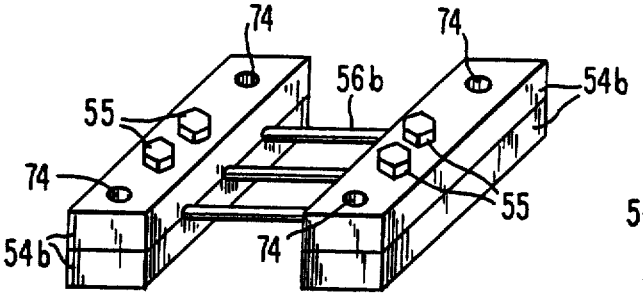
FIGS. 8 through 17 depict various embodiments of cables and cable clamps suitable for incorporation in an endless drive system in accordance with the present invention.

Likewise, the cable clamps 54 and cables 56 can have any of several configurations. FIG. 8 depicts two cable clamps, each formed of two halves 54b, held together by bolt and nut fasteners 55, with one cable clamp being on each end of each of a plurality of cables 56b. Each cable clamp half 54b has a number of recesses on its interior surface for receipt of the cables.

Figure 9:
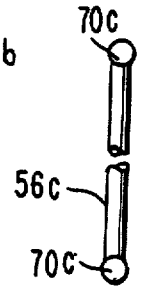
Figure 10:
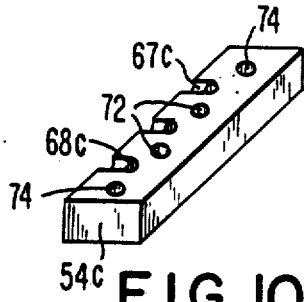

FIG. 9 depicts a cable 56c having a spherical retaining member or button 70c on each end. FIG. 10 depicts a corresponding cable clamp half 54c having in its interior surface a number of recesses, each of which includes a channel opening 67c and terminates in a hemispherical recess 68c so that when two cable clamp halves 54c are clamped on the ends of a set of cables 56c, the spherical retaining members 70c are firmly gripped within the recesses 68c of the two cable halves 54c to retain the cables 56c within the cable clamp. Spherical retaining members 70c can move within the hemispherical recesses 68c to align cables 56c and the cable clamping system as required.

Figure 11:
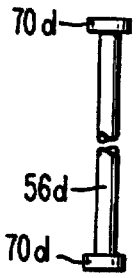
Figure 12:
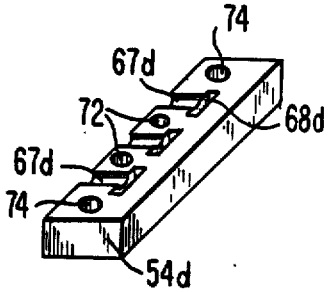

FIGS. 11 and 12 depict an alternative form of cable 56d and cable clamp half 54d. Each cable 56d has a retaining member or button 70d encircling each end, and each cable clamp half 54d has a recess on its interior surface, including a channel opening 67d and terminating hemispherical recess 68d for gripping the retaining members 70d.

Figure 13:
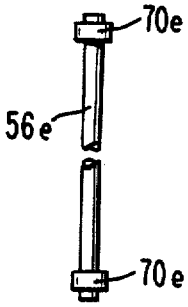
Figure 14:
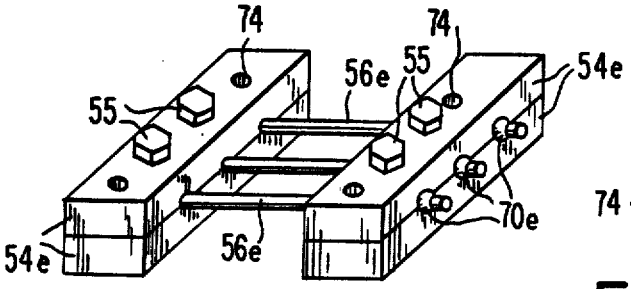
Figure 15:
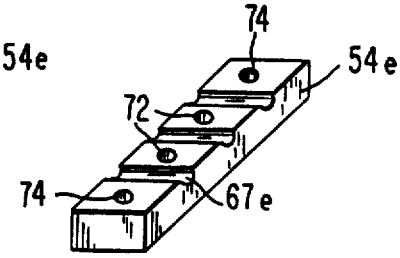

FIGS. 13, 14, and 15 depict a further embodiment of cable 56e and cable clamp halves 54e. Each cable 56e has an annular retaining member or button 70e encircling the cable adjacent each end thereof. The cable clamp halves 54e have recesses 67e in the form of channel openings passing therethrough so that, as depicted in FIG. 14, each cable 56e extends completely through the clamp, with retaining members 70e outside the clamp but preventing the cables 56e from being pulled from the clamp. In addition to retaining the cables within the cable clamps, the retaining members 70c, 70d, and 70e prevent expanding, fraying, or unwinding of the cable ends.

Figure 16:
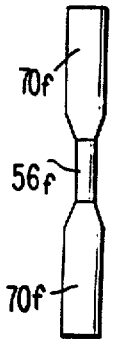
Figure 17:
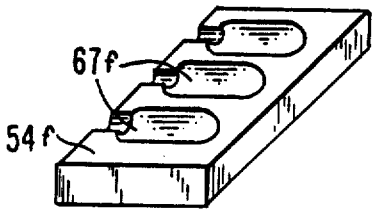

FIG. 16 depicts another preferred form of cable 56f having retaining members or buttons 70f on each end. Each retaining member 70f is a mild steel cylinder, tapered on its inner end, which is slipped over the end of cable 56f and squeezed or swaged to fit tightly over the cable end. The mating cable clamp halves 54f, depicted in FIG. 17, have recesses 67f to receive and retain members 70f. The mild steel retaining members 70f are sufficiently deformable that recesses 67f can be formed as cable clamp halves 54f are molded, rather than by machining. Retaining members 70f are of a length that results in only a short portion of cable 56f being exposed, for example about one inch. The taper of the inner ends of retaining members 70f acting on the corresponding ends of recesses 67f causes the retaining members to be more tightly clamped around cables 56f as force is exerted on the cables during operation.

Each cable clamp half 54 has a first set of openings 72 therethrough for bolt and nut fasteners 55, which fasten the cable clamp halves together about the ends of the cables 56, and a second set of openings 74 for bolt and nut fasteners 38 and 40. Alternatively, the lower cable clamp halves 54 can be cast or otherwise formed as a part of contact surface 30 with openings 72 therethrough.

The cable clamps 54 and cables 56 of FIGS. 8–17 can be encased within a resilient housing 58 as depicted in FIGS. 2–7. Alternatively, the endless drive sections 24 can be joined by cable connector sections formed only by cable clamps 54 and cables 56, with no resilient housing. Thus, for example, each cable connector section can be formed of cable clamps and cables of the type depicted in FIG. 8 or FIG. 14. The cables 56b or 56e can be bare or can be coated with rubber or other resilient material, as desired.

Figure 18:
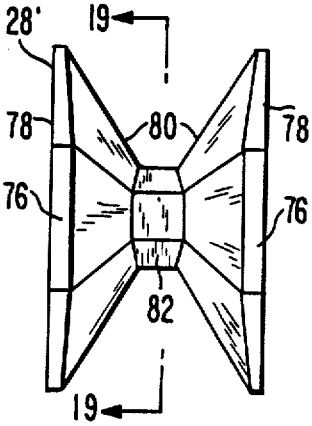
FIG. 18 is a front elevational view of a wheel suitable for incorporation in an endless drive system in accordance with the present invention.
Figure 19:
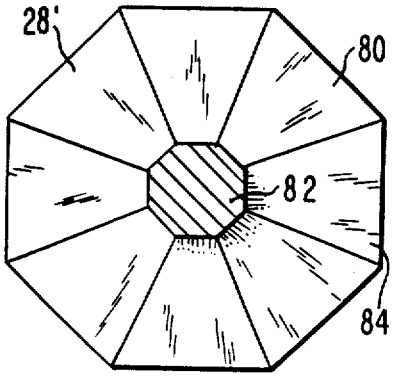
FIG. 19 is a sectional view taken along line 19—19 of FIG. 18.

As can be seen from FIGS. 2 through 7, the endless drive sections have sloping side walls 32 and so their width varies from a maximum at the shoe portion 30 to a minimum at the central surface 34. FIGS. 18 and 19 depict a wheel 28′ suitable for use as a drive wheel in an endless drive system in accordance with the present invention. Wheel 28′ includes first and second side portions 76, each of which can have a substantially flat exterior surface 78 and an interior surface 80 sloped at an angle to match the angle of the sloping side walls of the endless drive sections 24. Central portion 82 connects the two side portions 76 of wheel 28′. As can be seen particularly from FIG. 19, the sloped interior surfaces 80 are formed of a number of wedges, each wedge being shaped to match the corresponding side wall of the endless drive sections that are to be utilized with the wheel 28′. Thus, the embodiment of wheel 28′ depicted in FIGS. 18 and 19 has a number of wedges 84 of a truncated triangular shape, matching the truncated triangular shape of the side surfaces of endless drive sections 24a of FIG. 2. Endless drive sections 24b and 24d of FIGS. 3 and 5 require wheels having triangular wedges. The number of wedges 84, as well as the shape and size of those wedges, is determined by the central angle of the endless drive section and the dimensions of the endless drive section side walls. Typically, wheel 28′ might have a diameter in the order of about 36 inches or about 48 inches. If only one end wheel 28 is a drive wheel, the other end wheel can be rounded to receive the endless drive sections rather than being configured like drive wheel 28′ of FIGS. 18 and 19. Likewise, idler wheels 29 need not be configured like drive wheel 28′ but instead can be rounded. Alternatively, idler wheels 29 could be smaller and positioned at points to support the endless drive sections 24 in straight upper and lower runs.

Figure 20:
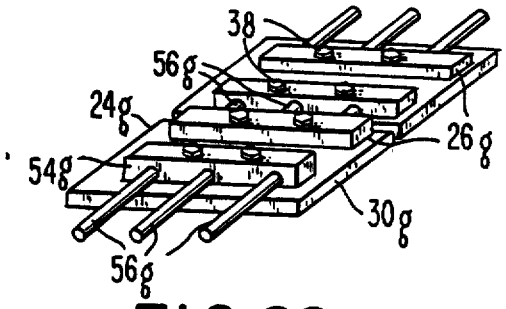
FIG. 20 depicts a further embodiment of an endless drive system in accordance with the present invention.

FIG. 20 depicts an endless drive system for very light duty such as a light duty vehicle or an endless conveyor. The cables 56g and the cable clamps 54g are fastened by bolt and nut fasteners 38 directly to the shoe portion 30g. Thus, the endless drive sections 24g do not have side walls or central surfaces, and the cable connector sections 26g do not have rubber housings. The cables 56g can be bare or can be coated with rubber or other suitable material, depending upon the environment in which the endless drive system is to be used.

Figure 28:
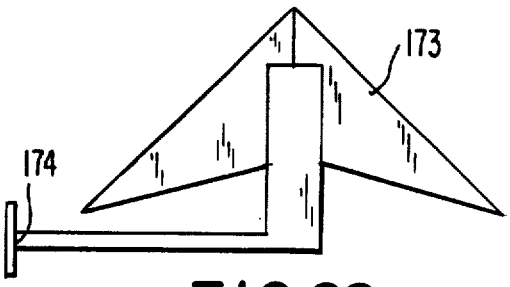
FIG. 28 is a perspective view of a tool useful with the endless drive system.

For heavy duty use, cables 56 are preferably steel cables. For light duty, other materials can be used, for example, nylon or other high strength, light weight cord. Likewise, while the drawings have shown the cable connector sections 26 as having discrete pieces of cable, continuous cables extending the entire length of the endless drive system and fastened by the cable clamps 54 to each endless drive section 24 could be utilized. When used on a tractor as shown in FIGS. 1 and 28, preferably the cable members are long enough to provide a space of about one inch between adjacent endless drive sections.

Figure 21:
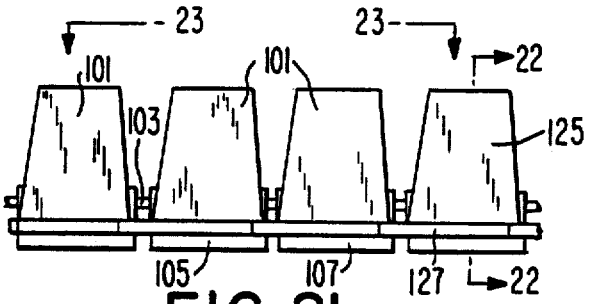
FIG. 21 is an elevational view of several endless drive sections connected together in accordance with another embodiment of the present invention.
Figure 22:
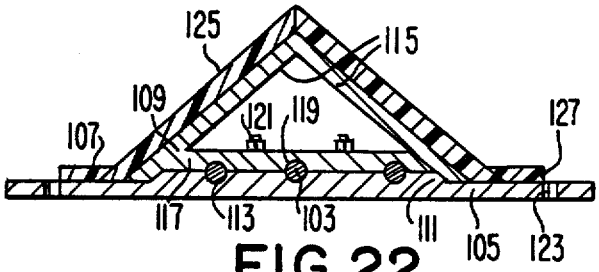
FIG. 22 is a sectional view along lines 22—22 of FIG. 21.
Figure 23:
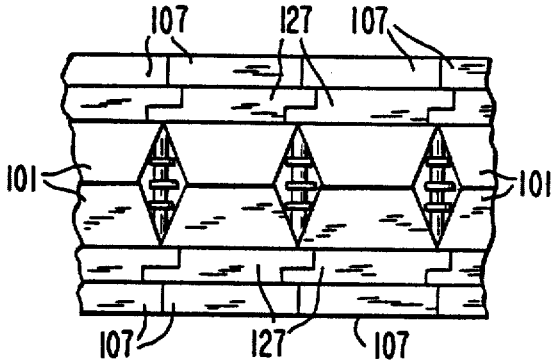
FIG. 23 is a fragmentary view taken along line 23—23 of FIG. 21.

A further embodiment of the invention can be seen in FIGS. 21 through 23. FIG. 21 is a side elevational view of a series of endless drive sections 101 joined together by connector sections 103. As seen in FIG. 22 each drive section includes a grouser bar 105 having a portion 107 extending laterally beyond the closed shoe portion 109. Grouser bar 105 has a boss plate 111 formed integrally therewith, and boss plate 111 has grooves 113 formed therein, extending in the longitudinal direction of the overall endless drive system. The closed shoe portion 109 is made in the form of an A-frame including first and second trapezoidal side walls 115, which slope inwardly toward the center of the endless drive section, and cable clamp bar 117. Cable clamp bar 117 has grooves 119 formed therein which cooperate with grooves 113 in boss plate 111 to clamp the cables of connector sections 103 therebetween. Cable clamp bar 117 has apertures to receive nut and bolt arrangements 121 for clamping boss plate 111 to cable clamp bar 117 to hold the clamp connector section 103. Cables 56f of FIG. 16 are particularly suited for use with cable clamp bar 117 and boss plate 111.

Laterally extending portion 107 has holes 123 therethrough to allow dirt to fall away so that it does not interfere with the working of the apparatus. The endless drive sections 101 are provided with wear pads 125 and 127.

Figure 24:
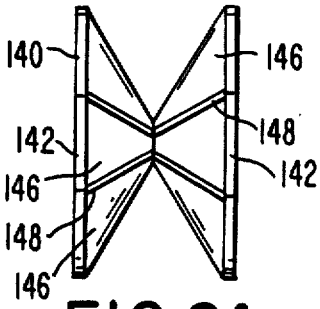
FIG. 24 is a perspective view of a wheel suitable for use with the drive sections of FIG. 21.

As seen in FIG. 24, drive wheel 140 can be made of side portions 142 each including a plurality of wedge-shaped sectors 146 with rounded bars 148 between adjacent sectors 146. The rounded bars 148 interfit between the adjacent endless drive sections 101 to provide positive engagement therewith for driving the endless drive system from the drive wheel 140. As can be appreciated from FIGS. 22 and 24, the laterally extending portions 107 of a plurality of sections 101 form a side rail on which the peripheral edges of side portions 142 of wheel 140 and similar idler wheels rest, improving the weight distribution of the drive wheel and idler wheels on the endless drive sections. As seen particularly in FIG. 23, the wear pads 127 are preferably made to lap over two adjacent drive sections 101.

Figure 25:
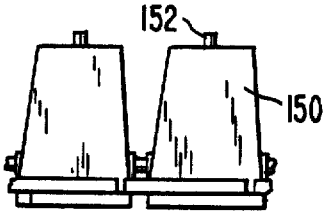
FIG. 25 is an elevational view of two endless drive sections connected together in accordance with a further embodiment of the present invention.
Figure 26:
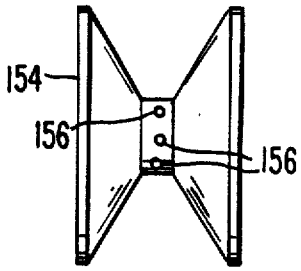
FIG. 26 is a perspective view of a wheel suitable for use with the drive sections of FIG. 25.

FIGS. 25 and 26 depict respectively an embodiment of an endless drive section 150 having drive pins 152 extending from the top thereof and an embodiment of a drive wheel 154 having spaced recesses 156 to receive the drive pins 152 to provide positive engagement between wheel 154 and sections 150.

Figure 27:
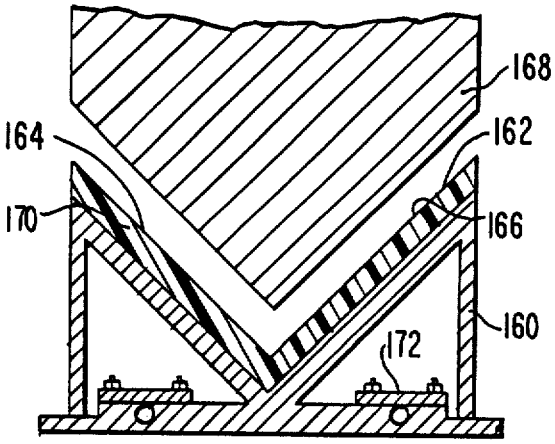
FIG. 27 is a sectional view through a wheel and drive section of another embodiment of the present invention.

FIG. 27 discloses a further embodiment of the invention in which an endless drive section 160 has a concave drive surface 162. Preferably surface 162 is made up of flat surfaces 164 and 166 which meet at an obtuse angle. In this embodiment the drive wheel 168 has a convex outer profile adapted to cooperate with the concave drive surface 162 of the drive section. The flat surfaces 164 and 166 are provided with wear pads 170, and the endless drive sections 160 are joined to adjacent sections by connector sections 172.

FIG. 28 shows a tool which is particularly useful with the embodiment of FIG. 26, but may also be used with the other embodiments. A V-shaped scraper blade 173 is supported by a bracket 174 which can be affixed to the side of the tractor or to some other supporting surface to scrape dirt or other foreign material from the surfaces 164 and 166 to prevent such foreign material from abrading or in other ways interfering with the operation of the endless drive system.

Figure 29:
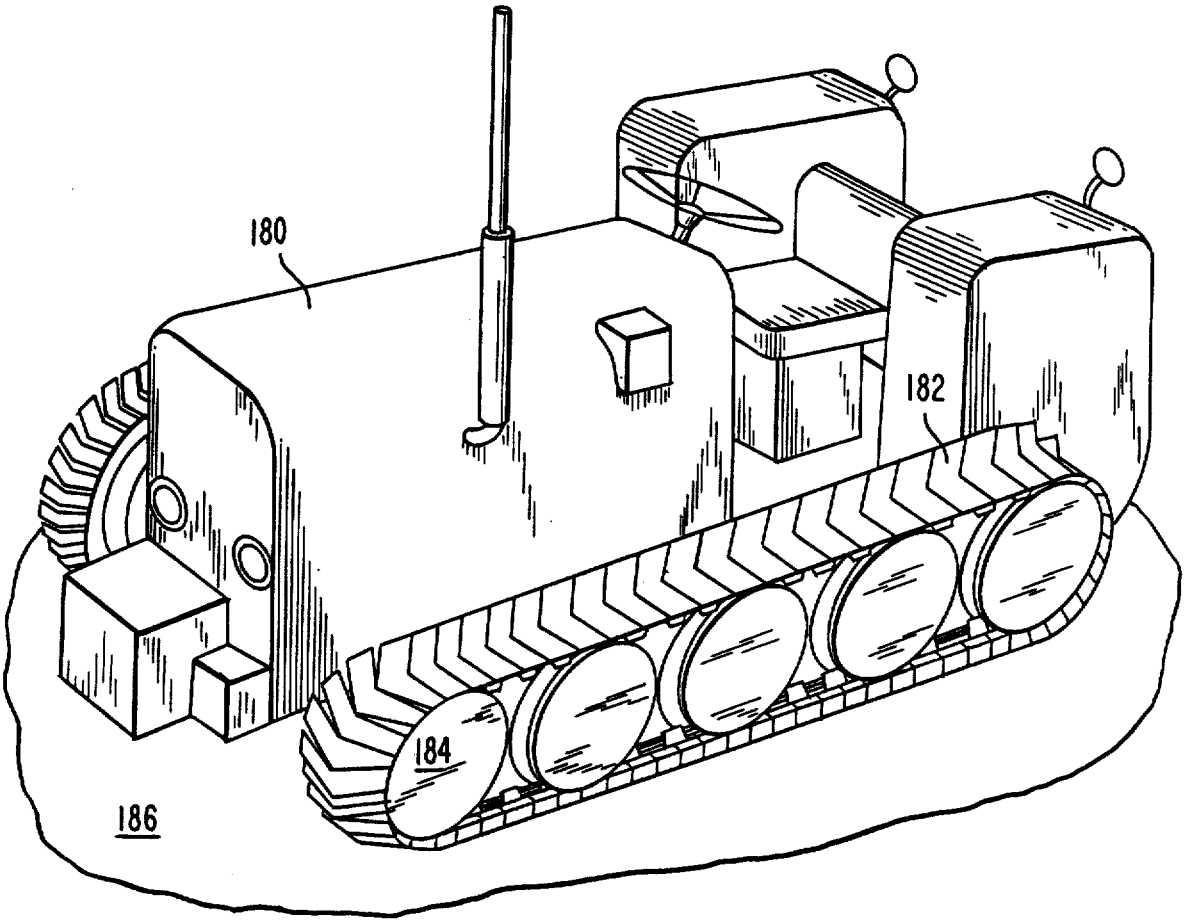
FIG. 29 is a perspective view of a tractor equipped with a pair of endless drive systems in accordance with another embodiment of the present invention.

FIG. 29 shows a tractor 180 equipped with endless drive systems according to another embodiment of the invention. In this case, the grouser bars 182 are provided in the shape of a chevron, with the convex angle pointing toward the forward direction of motion of the tractor. Thus, as the grouser bars 182 of an endless drive system turn around a forward wheel 184, the apex of the chevron digs into ground 186 to enhance the traction of the endless drive system.

It is thus seen that in accordance with the present invention an improved endless drive system is provided. Although the present invention has been described with reference to preferred embodiments, numerous rearrangements and alterations could be made, and still the result would be within the scope of the invention.

What is claimed is:

1. An endless drive system comprising:

a plurality of endless drive sections each including a substantially closed shoe portion having first and second side edges, first and second substantially closed side walls extending from the first and second side edges of the shoe portion and sloping inwardly therefrom toward the center of the endless drive section, and a central surface joining the first and second side walls to define therewith and with the shoe portion a chamber open at its end faces; and a like plurality of cable connector sections, each including at least one cable member and means to attach one end of the cable connector section to the shoe portion of a first one of the endless drive sections and the other end of the cable connector section to the shoe portion of a second one of the endless drive sections, such attachments being within the chambers of the endless drive sections, to cause the plurality of cable connector sections to join the plurality of endless drive sections in a closed loop as an endless drive system.

2. An endless drive system as claimed in claim 1 in which each endless drive section further includes a pair of wear pads and means to attach one wear pad to each side wall.

3. An endless drive system as claimed in claim 2 in which said wear pads are polyurethane.

4. An endless drive system as claimed in claim 1 in which each endless drive section further includes a tread member attached to the shoe portion thereof.

5. An endless drive system as claimed in claim 4 in which each tread member includes a grouser.

6. An endless drive system as claimed in claim 1 in which each cable connector section attaching means comprises a first cable clamp fastened to each cable member of the cable connector section, a second cable clamp fastened to each cable member of the cable connector section, means for fastening the first cable clamp to the shoe portion of the first one of the endless drive sections and means for fastening the second cable clamp to the shoe portion of the second one of the endless drive sections.

7. An endless drive system as claimed in claim 6 in which each cable clamp comprises a pair of cable clamp halves and means for fastening the pair of cable clamp halves together on the corresponding cable members.

8. An endless drive system as claimed in claim 7 in which each cable clamp half includes at least one recess for receipt of the at least one cable member.

9. An endless drive system as claimed in claim 8 in which each cable member is a discrete cable piece extending from the first cable clamp to the second cable clamp.

10. An endless drive system as claimed in claim 9 in which each cable piece has a retaining member on each end thereof.

11. An endless drive system as claimed in claim 10 in which the cable clamp recesses are shaped to permit passage of the cable members through the cable clamp and the retaining members are positioned outside the cable clamp to prevent the cable from pulling out of the cable clamps.

12. An endless drive system as claimed in claim 10 in which the cable clamp recesses are shaped to receive and retain the retaining members within the cable clamp.

13. An endless drive system as claimed in claim 12 in which the retaining members are spherical.

14. An endless drive system as claimed in claim 12 in which the retaining members are cylindrical members swaged onto the cable ends.

15. An endless drive system as claimed in claim 1 in which each cable member includes a multi-strand cable.

16. An endless drive system as claimed in claim 15 in which each multi-strand cable is covered by a resilient coating to prevent foreign objects from reaching the cable strands.

17. An endless drive system as claimed in claim 16 in which the resilient coating is rubber.

18. An endless drive system as claimed in claim 1 in which each cable connector section further includes a resilient housing encasing the at least one cable and the attaching means.

19. An endless drive system as claimed in claim 18 in which the housing is spaced from the side walls and the central surface to permit foreign objects to fall therefrom.

20. An endless drive system as claimed in claim 18 in which each housing has an opening therethrough to increase flexibility.

21. An endless drive system as claimed in claim 18 in which the resilient housings are rubber.

22. An endless drive system as claimed in claim 1 further comprising a drive wheel including:

an axle-like central portion; and first and second side portions, each side portion having an exterior surface with a periphery and having an interior surface formed of a plurality of wheel drive sectors, each wheel drive sector having a first end adjacent and connected to the periphery of the associated side portion exterior surface and sloping inwardly to a second end adjacent and connected to one end of said central portion to cause said central portion to connect said first and second side portions, the slopes of said wheel drive sectors substantially matching the slopes of said endless drive section side walls; said closed loop looping about said drive wheel with at least some of the endless drive sections contacting at least some of the wheel drive sectors.

23. An endless drive section as claimed in claim 22 in which each wheel drive sector is wedge-shaped with the wedge wide end adjacent and connected to the periphery of the associated side portion exterior surface and the narrow end adjacent and connected to the central portion.

24. An endless drive section as claimed in claim 23 in which each wedge-shaped wheel drive sector has a truncated triangular shape.

25. An endless drive system as claimed in claim 1 in which said cable member has sufficient length to provide a space of about one inch between shoe portions of adjacent endless drive sections.

26. An endless drive system as claimed in claim 25 in which each endless drive section further includes first and second side walls extending from the first and second side edges of the shoe portion and sloping inwardly therefrom and means joining said side walls at the center of the endless drive system.

27. An endless drive system as claimed in claim 26 in which said means to attach one end of the cable connector sections to the shoe portion of one endless drive section is a cable clamp bar integral with said first and second side walls.

28. An endless drive system as claimed in claim 27 in which said cable clamp bar and said shoe portion have opposed complementary grooves to receive said cable member.

29. An endless drive system as claimed in claim 26 in which said first and second side walls are trapezoidal.

30. An endless drive system as claimed in claim 1 in which each of said endless drive sections includes a grouser bar having a portion extending laterally beyond the closed shoe portion.

31. An endless drive system as claimed in claim 30 in which said grouser bar is V-shaped.

32. An endless drive system as claimed in claim 30 in which said grouser bar has holes therethrough in the portion thereof extending laterally beyond the closed shoe portion to permit the escape of dirt and debris.

33. An endless drive system as claimed in claim 30 in which each endless drive section further includes wear pads for the laterally extending portions of said grouser bars and means for attaching said wear pads to said portions.

34. An endless drive system as claimed in claim 33 in which said wear pads are polyurethane.

35. An endless drive system as claimed in claim 33 in which at least a portion of at least some of said wear pads extends longitudinally to lap onto the grouser bar portion of an adjacent endless drive section.

36. A drive wheel for an endless drive system in which the endless drive system includes a plurality of endless drive sections [each including a substantially closed shoe portion having first and second side faces which sections are] linked to adjacent sections to form [a gap] *gaps* therebetween, said drive wheel comprising first and second side portions and axle means joining said first and second side portions, each side portion including a plurality of wedge-shaped sectors and ridge means between said sectors adapted to fit into [a gap] *said gaps* between [adjacent] *said* endless drive sections [in an] *of said* endless drive system trained over said drive wheel.

37. A drive wheel as claimed in claim 36 in which said ridge means are rounded bars.

38. A drive wheel as claimed in claim 36 in which said sectors are flat trapezoids and said ridge means are formed by joined adjacent edges of said trapezoidal sectors.

39. A drive wheel as claimed in claim 36 in which said sectors are flat trapezoids and said ridge means are rounded bars located at intersections of adjacent trapezoidal sectors.

40. A drive wheel for an endless drive system *in which the endless drive system includes a plurality of endless drive sections connected in such a way that gaps are formed therebetween*, said drive wheel comprising:

an axle-like central portion; and first and second side portions, each side portion having an exterior surface with a periphery and having an interior surface formed of a plurality of wheel drive sectors *with ridge means therebetween*, each wheel drive sector having a first end adjacent and connected to the periphery of the associated side portion exterior surface and sloping inwardly to a second end adjacent and connected to one end of said central portion to cause said central portion to connect said first and second side portions, *each wheel drive sector adapted to engage said endless drive sections of said endless drive system, and each ridge means adapted to fit into said gaps between endless drive sections.*

41. A drive wheel as claimed in claim 40 in which each wheel drive sector is wedge-shaped with the wedge wide end adjacent and connected to the periphery of the associated side portion exterior surface and the narrow end adjacent and connected to the central portion.

42. A drive wheel as claimed in claim 41 in which each wedge-shaped wheel drive sector has a truncated triangular shape.

43. A drive wheel as claimed in claim 40 [further comprising] *in which said ridge means comprise* ridge members extending from the peripheries of the side portions to said central portion between adjacent ones of said wheel drive sectors.

44. A drive wheel as claimed in claim 40 in which said central portion includes a plurality of recesses for receiving drive pins from *said* endless drive sections to provide positive drive engagement between said drive wheel and [the] *said* endless drive sections.

*45. An endless track drive system for a tracked vehicle comprising:*

*a plurality of drive sections, each said drive section including a base portion and at least one lateral polymeric frictional drive face extending from said base portion for driving said drive section; and*

*at least one connector section connecting a pair of said drive sections to one another to form an endless vehicle track, each said connector section having a first end and a second end, said first and second ends being connected to respective ones of said pair of said drive sections.*

*46. An endless track drive system as claimed in claim 45, said at least one lateral polymeric frictional drive face sloping inwardly from said base portion.*

*47. An endless track drive system as claimed in claim 45, said at least one lateral polymeric frictional drive face sloping outwardly from said base portion.*

*48. An endless track drive system for a tracked vehicle comprising:*

*a plurality of drive sections, each said drive section including a base portion and at least one lateral polymeric frictional drive face extending from said base portion for driving said drive section; and*

*a plurality of connector sections connecting said drive sections to one another to form an endless vehicle track, each said connector section having a first end and a second end, said first and second ends being connected to respective ones of an adjacent pair of said drive sections.*

*49. An endless track drive system as claimed in claim 48, said at least one lateral polymeric frictional drive face sloping inwardly from said base portion.*

*50. An endless track drive system as claimed in claim 48, said at least one lateral polymeric frictional drive face sloping outwardly from said base portion.*

*51. An endless track drive system as claimed in claim 48, each connector including at least one cable member.*

*52. An endless track drive system as claimed in claim 51, each cable member of each connector section being integrally formed with a cable member of each adjacent connector section to provide at least one continuous cable joining the plurality of drive sections to one another to form said endless vehicle track.*

*53. An endless track drive system for a tracked vehicle comprising:*

*a plurality of drive sections, each said drive section including a base portion and at least two lateral polymeric frictional drive faces sloping inwardly from said base portion for driving said drive section; and*

*at least one connector section connecting a pair of said drive sections to one another to form an endless vehicle track, each said connector section having a first end and a second end, said first and second ends being connected to respective ones of said pair of said drive sections.*

*54. An endless track drive system as claimed in claim 53, each said drive section including at least two side wall portions sloping inwardly from said base portion, said at least two lateral polymeric frictional drive faces being supported by said at least two side wall portions.*

*55. An endless track drive system as claimed in claim 53, at least one of said drive sections having a triangular transverse cross-section.*

*56. An endless track drive system as claimed in claim 53, at least one of said drive sections having a truncated triangular transverse cross-section.*

*57. An endless track drive system as claimed in claim 53, at least one of said drive sections having a rounded-off truncated triangular transverse cross-section.*

*58. An endless track drive system as claimed in claim 53, said base portion extending beyond said inwardly sloping side walls to form flanges.*

*59. An endless track drive system as claimed in claim 58, said flanges including holes for permitting escape of debris.*

*60. An endless track drive system as claimed in claim 53, comprising a plurality of connector sections connecting said drive sections to one another to form an endless vehicle track, each said connector connecting an adjacent pair of said drive sections.*

*61. An endless track drive system for a tracked vehicle comprising:*

*a plurality of drive sections, each said drive section including a base portion and at least one lateral polymeric frictional drive face sloping outwardly from said base portion for driving said drive section; and*

*at least one connector section connecting a pair of said drive sections to one another to form an endless vehicle track, each said connector section having a first end and a second end, said first and second ends being connected to respective ones of said pair of said drive sections.*

*62. An endless track drive system for a tracked vehicle comprising:*

*a plurality of drive sections, each said drive section including a base portion and at least two lateral polymeric frictional drive faces sloping outwardly from said base portion for driving said drive section; and*

*at least one connector section connecting a pair of said drive sections to one another to form an endless vehicle track, each said connector section having a first end and a second end, said first and second ends being connected to respective ones of said pair of said drive sections.*

*63. An endless track drive system as claimed in claim 62, each said drive section including at least two side wall portions sloping outwardly from said base portion, said at least two lateral polymeric frictional drive faces being supported by said at least two side wall portions.*

*64. An endless track drive system for a tracked vehicle comprising:*

*a plurality of drive sections, each said drive section including a base portion and at least two lateral polymeric frictional drive faces sloping inwardly toward one another from said base portion for driving said drive section, said base portion including a medial portion between said sloping drive faces and first and second flanges extending beyond said sloping drive faces; and*

*at least one connector section connecting a pair of said drive sections to one another to form an endless vehicle track, each said connector section having a first end and a second end, said first and second ends being connected to respective ones of said pair of said drive sections.*

*65. An endless track drive system as claimed in claim 64, said first and second flanges including holes for permitting escape of debris.*

*66. An endless track drive system for a tracked vehicle comprising:*

*a plurality of drive sections, each said drive section including a base portion and at least two lateral polymeric frictional drive faces sloping inwardly from said base portion for driving said drive section;*

*at least one connector section connecting a pair of said drive sections to one another to form an endless vehicle track, each said connector section having a first end and a second end, said first and second ends being connected to respective ones of said pair of said drive sections; and*

*a drive wheel for driving said endless vehicle track, said drive wheel comprising at least two lateral frictional drive surfaces for engaging with the at least two lateral polymeric functional drive faces of each said drive section.*

*67. An endless track drive system for a tracked vehicle comprising:*

*a plurality of drive sections, each said drive section including a base portion and at least two lateral polymeric frictional drive faces sloping inwardly from said base portion for driving said drive section;*

*at least one connector section connecting a pair of said drive sections to one another to form an endless vehicle track, each said connector section having a first end and a second end, said first and second ends being connected to respective ones of said pair of said drive sections; and*

*a drive wheel for driving said endless vehicle track, said drive wheel including a plurality of lateral frictional drive surfaces, said lateral frictional drive surfaces being shaped to substantially match the shape of said lateral polymeric frictional drive faces of said drive sections.*

*68. An endless track drive system as claimed in claim 67, comprising a plurality of connector sections connecting said drive sections to one another to form an endless vehicle track, each said connector section connecting an adjacent pair of said drive sections.*

*69. An endless track drive system as claimed in claim 67, wherein when said drive wheel is driving said endless track, said base portions of said drive sections extend beyond the radial periphery of said drive wheel.*

*70. An endless track drive system as claimed in claim 67, said drive wheel including first and second side portions and an axle portion connecting said first and second side portions, and said axle portion of said drive wheel including additional frictional drive surfaces shaped to substantially match and engage with another polymeric frictional drive face on each drive section.*

*71. An endless track drive system as claimed in claim 67, said drive wheel further comprising sprocket means for further driving said drive sections.*

*72. An endless track drive system as claimed in claim 71, said sprocket means comprising rounded bars between adjacent lateral frictional drive surfaces of said drive wheel, which rounded bars interfit between and engage with said drive sections of said endless track drive system.*

*73. An endless track drive system as claimed in claim 71, said drive wheel including first and second side portions and an axle portion connecting said first and second side portions, and said sprocket means comprising recesses in said axle portion which engage with drive pins extending from said drive sections of said endless track drive system.*

*74. An endless track drive system for a tracked vehicle comprising:*

*a plurality of drive sections, each said drive section including a base portion and at least two lateral polymeric frictional drive faces sloping outwardly from said base portion for driving said drive section;*

*at least one connector section connecting a pair of said drive sections to one another to form an endless vehicle track, each said connector section having a first end and a second end, said first and second ends being connected to respective ones of said pair of said drive sections; and*

*a drive wheel for driving said endless vehicle track, said drive wheel including at least two frictional drive surfaces for engaging with said at least two lateral polymeric frictional drive faces of each said drive section.*

*75. An endless track drive system for a tracked vehicle comprising:*

*a plurality of drive sections, each drive section including a base portion and at least two lateral polymeric frictional drive faces sloping outwardly from said base portion for driving said drive section;*

*at least one connector section connecting a pair of said drive sections to one another to form an endless vehicle track, each said connector section having a first end and a second end, said first and second ends being connected to respective ones of said pair of said drive sections; and*

*a drive wheel for driving said endless vehicle track, said drive wheel including a plurality of lateral frictional drive surfaces, said lateral frictional drive surfaces being shaped to substantially match the shape of said lateral polymeric frictional drive faces of said drive sections.*

76. An endless track drive system as claimed in claim 75, comprising a plurality of connector sections connecting said drive sections to one another to form an endless vehicle track, each said connector section connecting an adjacent pair of said drive sections.

77. An endless track drive system as claimed in claim 75, wherein when said drive wheel is driving said endless vehicle track, said base portions of said drive sections extend beyond the radial periphery of said drive wheel.

78. A sprocketless endless track drive system for a tracked vehicle comprising:

a plurality of drive sections, each said drive section including a base portion and at least two lateral polymeric frictional drive faces sloping inwardly from said base portion for sprocketless frictional driving of said drive section; and at least one connector section connecting a pair of said drive sections to one another to form an endless vehicle track, each said connector section having a first end and a second end, said first and second ends being connected to respective ones of said pair of said drive sections.

79. An endless track drive system as claimed in claim 78, comprising a plurality of connector sections connecting said drive sections to one another to form an endless vehicle track, each said connector section connecting an adjacent pair of said drive sections.

80. An endless track drive system comprising:

a plurality of drive sections, each said drive section including a base portion and at least two lateral polymeric frictional drive faces sloping inwardly from said base portion for driving said drive section; and a plurality of cables connecting said drive sections to one another, each said cable having a first end and a second end, said first and second ends being connected to respective ones of adjacent pairs of drive sections to form an endless track.

81. An endless track drive system as claimed in claim 80, further comprising retaining members on each of said first and second cable ends, and first and second cable clamps with first and second fastening means for connecting said retaining members to a drive section.

82. An endless track drive system as claimed in claim 81, each said cable clamp comprising a pair of cable clamp halves with cooperating recesses for receiving at least one retaining member.

83. An endless track drive system as claimed in claim 80, each said cable further comprising a medial portion located between said first and second ends, said medial portion being encased in a polymeric material.

84. An endless track drive system as claimed in claim 80, further comprising retaining members on each of said first and second cable ends, and means for connecting the retaining members of each cable to respective ones of an adjacent pair of drive sections, each said connecting means including first and second cable clamps with first and second fastening means, the first cable clamp with the first fastening means connecting the retaining member on said first end of a given cable to one of said adjacent pair of drive sections, and the second cable clamp with the second fastening means connecting the retaining member on said second end of said given cable to the other of said adjacent pair of drive sections.

85. An endless track drive system as claimed in claim 84, each said cable clamp comprising a pair of cable clamp halves with cooperating recesses for receiving at least one retaining member.

86. An endless track drive system comprising:

a plurality of drive sections, each said drive section including a base portion and at least one lateral polymeric frictional drive face sloping inwardly from said base portion;

a plurality of connector sections connecting said drive sections to one another to form an endless track, each said connector section comprising at least one cable having a first end and a second end, a retaining member on each of said first and second ends, and means for connecting said retaining members to respective ones of an adjacent pair of drive sections to form an endless track; and a drive wheel for driving said endless track, said drive wheel including a plurality of lateral frictional drive surfaces, said lateral frictional drive surfaces being shaped to substantially match the shape of said lateral polymeric frictional drive faces of said drive sections.

87. An endless track drive system as claimed in claim 86, each said drive section including a base portion, at least two side wall portions sloping inwardly from said base portion, and at least two lateral polymeric frictional drive faces sloping inwardly from said base portion and supported by said at least two side wall portions, and said connecting means comprising first and second cable clamps with first and second fastening means, the first cable clamp with the first fastening means connecting the retaining member on said first end of said at least one cable to one of said adjacent drive sections, and the second cable clamp with the second fastening means connecting the retaining member on said second end of said at least one cable to the other of said adjacent drive sections.

88. An endless track drive system for a tracked vehicle comprising:

a plurality of drive sections, each said drive section including a base portion and at least two lateral polymeric frictional drive faces sloping inwardly from said base portion in a transverse direction with respect to said endless track drive system for driving said drive sections;

at least one connector section connecting a pair of said drive sections to one another to form an endless vehicle track, each said connector section having a first end and a second end, said first and second ends being connected to respective ones of said pair of said drive sections; and a drive wheel for driving said endless vehicle track, said drive wheel including at least two lateral frictional drive surfaces for engaging with said at least two lateral polymeric frictional drive faces of each said drive section;

side edges of the drive faces of each said drive section sloping inwardly from said base portion with respect to a longitudinal direction of said endless track drive system so that the side edges of drive faces of drive sections which are in contact with the drive wheel are substantially parallel to the side edges of drive faces of adjacent drive sections thereby minimizing any gaps therebetween.

* * * * *

UNITED STATES PATENT AND TRADEMARK OFFICE

CERTIFICATE OF CORRECTION

PATENT NO. : Re. 33,324

DATED : Sep. 4, 1990

INVENTOR(S) : Edwards et al.

It is certified that error appears in the above-identified patent and that said Letters Patent is hereby corrected as shown below:

Column 12:

In claim 51, line 14, after "connector" insert --section--.

In claim 60, line 55, after "connector" insert --section--.

Column 13:

In claim 66, line 52, change "functional" to --frictional--.

Signed and Sealed this

Twelfth Day of May, 1992

*Attest:*

DOUGLAS B. COMER

*Attesting Officer*

*Acting Commissioner of Patents and Trademarks*